US010467414B1

(12) United States Patent
Kindlund et al.

(10) Patent No.: US 10,467,414 B1
(45) Date of Patent: *Nov. 5, 2019

(54) SYSTEM AND METHOD FOR DETECTING EXFILTRATION CONTENT

(71) Applicant: FireEye, Inc., Milpitas, CA (US)

(72) Inventors: Darien Kindlund, Great Falls, VA (US); Julia Wolf, Mountain View, CA (US); James Bennett, Santa Clara, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,406

(22) Filed: Apr. 2, 2018

Related U.S. Application Data

(63) Continuation of application No. 15/425,954, filed on Feb. 6, 2017, now Pat. No. 9,934,381, which is a
(Continued)

(51) Int. Cl.
*G06F 12/14* (2006.01)
*G06F 9/455* (2018.01)
(Continued)

(52) U.S. Cl.
CPC ............ *G06F 21/566* (2013.01); *G06F 21/53* (2013.01); *G06F 21/561* (2013.01);
(Continued)

(58) Field of Classification Search
CPC .. G06F 21/566; G06F 21/53; G06F 2221/033; H04L 63/145; H04L 63/1416;
(Continued)

(56) References Cited

U.S. PATENT DOCUMENTS 4,292,580 A 9/1981 Ott et al.
5,175,732 A 12/1992 Hendel et al.
(Continued)

FOREIGN PATENT DOCUMENTS

GB 2439806 A 1/2008
WO 2002006928 1/2002
(Continued)

OTHER PUBLICATIONS

Crawford, Martin, and Gilbert Peterson. "Insider Threat Detection using Virtual Machine Introspection." System Sciences (HICSS), 2013 46th Hawaii International Conference on. IEEE, 2013. (Year: 2013).*
(Continued)

*Primary Examiner* — Michael Simitoski
(74) *Attorney, Agent, or Firm* — Rutan & Tucker, LLP

(57) ABSTRACT

Techniques for detecting exfiltration content are described herein. According to one embodiment, a malicious content suspect is executed and a packet inspection of outbound network traffic is performed by a packet inspector running within the virtual machine. Occurring before the outbound network traffic leaving the virtual machine, the packet inspector determines whether a portion of outbound network traffic matches one or more portions of predetermined network traffic patterns or signatures. If so, a determination is made whether the outbound network traffic includes at least one environmental property of the virtual machine that is unique or almost unique to the virtual machine. If so, migration of the outbound network traffic outside of the virtual machine is precluded and an alert is transmitted. The alert includes the malicious content suspect that is attempting to perform an exfiltration of data.

28 Claims, 6 Drawing Sheets

Related U.S. Application Data continuation of application No. 13/801,573, filed on Mar. 13, 2013, now Pat. No. 9,565,202.

(51) Int. Cl.
  *G06F 11/30* (2006.01)
  *H04L 29/06* (2006.01)
  *G06F 21/56* (2013.01)
  *G06F 21/53* (2013.01)

(52) U.S. Cl.
  CPC .......... *G06F 21/562* (2013.01); *G06F 21/565* (2013.01); *G06F 21/567* (2013.01); *H04L 63/14* (2013.01); *H04L 63/145* (2013.01); *H04L 63/1408* (2013.01); *H04L 63/1416* (2013.01); *H04L 63/1425* (2013.01); *H04L 63/1441* (2013.01); *G06F 2221/033* (2013.01)

(58) Field of Classification Search
  CPC ............. H04L 63/1425; H04L 63/1491; H04L 63/1441
  See application file for complete search history.

(56) References Cited

U.S. PATENT DOCUMENTS

| | | | |
|---|---|---|---|
| 5,440,723 A | 8/1995 | Arnold et al. | |
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |
| 6,094,677 A | 7/2000 | Capek et al. | |
| 6,269,330 B1 | 7/2001 | Cidon et al. | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | Sorhaug et al. | |
| 6,442,696 B1 * | 8/2002 | Wray ....................... G06F 21/31 713/176 |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,981,279 B1 * | 12/2005 | Arnold ................... G06F 21/566 703/27 |
| 7,007,107 B1 | 2/2006 | Ivehenko et al. | |
| 7,028,179 B2 | 4/2006 | Anderson et al. | |
| 7,043,757 B2 | 5/2006 | Hoefelmeyer et al. | |
| 7,069,316 B1 | 6/2006 | Gryaznov | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,100,201 B2 | 8/2006 | Izatt | |
| 7,159,149 B2 | 1/2007 | Spiegel et al. | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,287,278 B2 | 10/2007 | Liang | |
| 7,308,716 B2 | 12/2007 | Danford et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,603,715 B2 | 10/2009 | Costa et al. | |
| 7,607,171 B1 * | 10/2009 | Marsden ................. G06F 21/53 726/24 |
| 7,639,714 B2 | 12/2009 | Stolfo et al. | |
| 7,644,441 B2 | 1/2010 | Schmid et al. | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,849,506 B1 | 12/2010 | Dansey et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,761 B1 | 5/2011 | Bennett | |
| 7,996,556 B2 | 8/2011 | Raghavan et al. | |
| 7,996,836 B1 | 8/2011 | McCorkendale et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,201,246 B1 | 6/2012 | Wu et al. | |
| 8,204,984 B1 | 6/2012 | Aziz et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,709 B2 | 7/2012 | Viljoen et al. | |
| 8,239,944 B1 | 8/2012 | Nachenberg et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,353,031 B1 * | 1/2013 | Rajan ................... H04L 63/0209 726/22 |
| 8,365,286 B2 | 1/2013 | Poston | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 * | 3/2013 | Green ................... H04L 63/1416 726/11 |
| 8,510,827 B1 | 8/2013 | Leake et al. | |
| 8,510,842 B2 | 8/2013 | Amit et al. | |
| 8,516,593 B2 | 8/2013 | Aziz | |
| 8,528,086 B1 | 9/2013 | Aziz | |
| 8,539,582 B1 | 9/2013 | Aziz et al. | |
| 8,549,638 B2 | 10/2013 | Aziz | |
| 8,561,177 B1 | 10/2013 | Aziz et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,689,333 B2 | 4/2014 | Aziz | |
| 8,713,681 B2 | 4/2014 | Silberman et al. | |

(56) References Cited

U.S. PATENT DOCUMENTS

| | | | |
|---|---|---|---|
| 8,776,229 B1 | 7/2014 | Aziz | |
| 8,793,787 B2 | 7/2014 | Ismael et al. | |
| 8,832,829 B2 | 9/2014 | Manni et al. | |
| 8,850,060 B1* | 9/2014 | Beloussov | H04L 63/1408 709/235 |
| 8,850,571 B2* | 9/2014 | Staniford | H04L 63/1416 713/187 |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,027,135 B1 | 5/2015 | Aziz | |
| 9,071,638 B1 | 6/2015 | Aziz et al. | |
| 9,104,867 B1 | 8/2015 | Thioux et al. | |
| 9,106,694 B2 | 8/2015 | Aziz et al. | |
| 9,118,715 B2 | 8/2015 | Staniford et al. | |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,189,627 B1 | 11/2015 | Islam | |
| 9,195,829 B1 | 11/2015 | Goradia et al. | |
| 9,197,664 B1 | 11/2015 | Aziz et al. | |
| 9,223,972 B1 | 12/2015 | Vincent et al. | |
| 9,225,740 B1 | 12/2015 | Ismael et al. | |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,282,109 B1 | 3/2016 | Aziz et al. | |
| 9,294,501 B2 | 3/2016 | Mesdaq et al. | |
| 9,300,686 B2 | 3/2016 | Pidathala et al. | |
| 9,306,960 B1 | 4/2016 | Aziz | |
| 9,306,974 B1 | 4/2016 | Aziz et al. | |
| 9,311,479 B1 | 4/2016 | Manni et al. | |
| 9,565,202 B1 | 2/2017 | Kindlund et al. | |
| 9,934,381 B1 | 4/2018 | Kindlund et al. | |
| 2001/0005889 A1 | 6/2001 | Albrecht | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1 | 7/2002 | Melchione et al. | |
| 2002/0144156 A1 | 10/2002 | Copeland | |
| 2002/0162015 A1 | 10/2002 | Tang | |
| 2002/0166063 A1 | 11/2002 | Lachman et al. | |
| 2002/0184528 A1 | 12/2002 | Shevenell et al. | |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0115483 A1 | 6/2003 | Liang | |
| 2003/0188190 A1 | 10/2003 | Aaron et al. | |
| 2003/0200460 A1 | 10/2003 | Morota et al. | |
| 2003/0212902 A1 | 11/2003 | van der Made | |
| 2003/0237000 A1 | 12/2003 | Denton et al. | |
| 2004/0003323 A1 | 1/2004 | Bennett et al. | |
| 2004/0015712 A1 | 1/2004 | Szor | |
| 2004/0019832 A1 | 1/2004 | Arnold et al. | |
| 2004/0047356 A1 | 3/2004 | Bauer | |
| 2004/0083408 A1 | 4/2004 | Spiegel et al. | |
| 2004/0093513 A1 | 5/2004 | Cantrell et al. | |
| 2004/0111531 A1 | 6/2004 | Staniford et al. | |
| 2004/0165588 A1 | 8/2004 | Pandya | |
| 2004/0236963 A1 | 11/2004 | Danford et al. | |
| 2004/0243349 A1 | 12/2004 | Greifeneder et al. | |
| 2004/0249911 A1 | 12/2004 | Alkhatib et al. | |
| 2004/0255161 A1 | 12/2004 | Cavanaugh | |
| 2004/0268147 A1 | 12/2004 | Wiederin et al. | |
| 2005/0021740 A1 | 1/2005 | Bar et al. | |
| 2005/0033960 A1 | 2/2005 | Vialen et al. | |
| 2005/0033989 A1 | 2/2005 | Poletto et al. | |
| 2005/0050148 A1 | 3/2005 | Mohammadioun et al. | |
| 2005/0086523 A1 | 4/2005 | Zimmer et al. | |
| 2005/0091513 A1 | 4/2005 | Mitomo et al. | |
| 2005/0091533 A1 | 4/2005 | Omote et al. | |
| 2005/0114663 A1 | 5/2005 | Cornell et al. | |
| 2005/0125195 A1 | 6/2005 | Brendel | |
| 2005/0157662 A1 | 7/2005 | Bingham et al. | |
| 2005/0183143 A1 | 8/2005 | Anderholm et al. | |
| 2005/0201297 A1 | 9/2005 | Peikari | |
| 2005/0210533 A1 | 9/2005 | Copeland et al. | |
| 2005/0238005 A1 | 10/2005 | Chen et al. | |
| 2005/0265331 A1 | 12/2005 | Stolfo | |
| 2006/0010495 A1 | 1/2006 | Cohen et al. | |
| 2006/0015715 A1 | 1/2006 | Anderson | |
| 2006/0021054 A1 | 1/2006 | Costa et al. | |
| 2006/0031476 A1 | 2/2006 | Mathes et al. | |
| 2006/0047665 A1 | 3/2006 | Neil | |
| 2006/0070130 A1 | 3/2006 | Costea et al. | |
| 2006/0075496 A1 | 4/2006 | Carpenter et al. | |
| 2006/0095968 A1 | 5/2006 | Portolani et al. | |
| 2006/0101516 A1 | 5/2006 | Sudaharan et al. | |
| 2006/0101517 A1 | 5/2006 | Banzhof et al. | |
| 2006/0117385 A1 | 6/2006 | Mester et al. | |
| 2006/0123477 A1 | 6/2006 | Raghavan et al. | |
| 2006/0143709 A1 | 6/2006 | Brooks et al. | |
| 2006/0150249 A1 | 7/2006 | Gassen et al. | |
| 2006/0161983 A1 | 7/2006 | Cothrell et al. | |
| 2006/0161987 A1 | 7/2006 | Levy-Yurista | |
| 2006/0161989 A1 | 7/2006 | Reshef et al. | |
| 2006/0164199 A1 | 7/2006 | Gilde et al. | |
| 2006/0173992 A1 | 8/2006 | Weber et al. | |
| 2006/0179147 A1 | 8/2006 | Tran et al. | |
| 2006/0184632 A1 | 8/2006 | Marino et al. | |
| 2006/0191010 A1 | 8/2006 | Benjamin | |
| 2006/0221956 A1 | 10/2006 | Narayan et al. | |
| 2006/0236393 A1 | 10/2006 | Kramer et al. | |
| 2006/0242709 A1 | 10/2006 | Seinfeld et al. | |
| 2006/0251104 A1 | 11/2006 | Koga | |
| 2006/0288417 A1 | 12/2006 | Bookbinder et al. | |
| 2007/0006288 A1 | 1/2007 | Mayfield et al. | |
| 2007/0006313 A1 | 1/2007 | Porras et al. | |
| 2007/0011174 A1 | 1/2007 | Takaragi et al. | |
| 2007/0016951 A1 | 1/2007 | Piccard et al. | |
| 2007/0033645 A1 | 2/2007 | Jones | |
| 2007/0038943 A1 | 2/2007 | FitzGerald et al. | |
| 2007/0064689 A1 | 3/2007 | Shin et al. | |
| 2007/0094730 A1 | 4/2007 | Bhikkaji et al. | |
| 2007/0143827 A1 | 6/2007 | Nicodemus et al. | |
| 2007/0156895 A1 | 7/2007 | Vuong | |
| 2007/0157180 A1 | 7/2007 | Tillmann et al. | |
| 2007/0157306 A1 | 7/2007 | Elrod et al. | |
| 2007/0171824 A1 | 7/2007 | Ruello et al. | |
| 2007/0171921 A1 | 7/2007 | Wookey et al. | |
| 2007/0174915 A1 | 7/2007 | Gribble et al. | |
| 2007/0192500 A1 | 8/2007 | Lum | |
| 2007/0192858 A1 | 8/2007 | Lum | |
| 2007/0198275 A1 | 8/2007 | Malden et al. | |
| 2007/0240218 A1 | 10/2007 | Tuvell et al. | |
| 2007/0240219 A1 | 10/2007 | Tuvell et al. | |
| 2007/0240220 A1 | 10/2007 | Tuvell et al. | |
| 2007/0240222 A1 | 10/2007 | Tuvell et al. | |
| 2007/0250930 A1 | 10/2007 | Aziz et al. | |
| 2007/0271446 A1 | 11/2007 | Nakamura | |
| 2008/0005782 A1 | 1/2008 | Aziz | |
| 2008/0072326 A1 | 3/2008 | Danford et al. | |
| 2008/0077793 A1* | 3/2008 | Tan | G06F 21/56 713/168 |
| 2008/0080518 A1 | 4/2008 | Hoeflin et al. | |
| 2008/0098476 A1 | 4/2008 | Syversen | |
| 2008/0120722 A1 | 5/2008 | Sima et al. | |
| 2008/0134178 A1 | 6/2008 | Fitzgerald et al. | |
| 2008/0134334 A1 | 6/2008 | Kim et al. | |
| 2008/0141376 A1 | 6/2008 | Clausen et al. | |
| 2008/0162849 A1* | 7/2008 | Savagaonkar | G06F 12/145 711/163 |
| 2008/0184367 A1 | 7/2008 | McMillan et al. | |
| 2008/0184373 A1 | 7/2008 | Traut et al. | |
| 2008/0189787 A1* | 8/2008 | Arnold | G06F 21/51 726/24 |
| 2008/0215742 A1 | 9/2008 | Goldszmidt et al. | |

(56) References Cited

U.S. PATENT DOCUMENTS

| | | | |
|---|---|---|---|
| 2008/0222729 A1* | 9/2008 | Chen | G06F 21/566 726/24 |
| 2008/0263665 A1 | 10/2008 | Ma et al. | |
| 2008/0295172 A1 | 11/2008 | Bohacek | |
| 2008/0301810 A1 | 12/2008 | Lehane et al. | |
| 2008/0307524 A1* | 12/2008 | Singh | G06F 21/55 726/22 |
| 2008/0320594 A1 | 12/2008 | Jiang | |
| 2009/0007100 A1 | 1/2009 | Field et al. | |
| 2009/0013408 A1 | 1/2009 | Schipka | |
| 2009/0031423 A1 | 1/2009 | Liu et al. | |
| 2009/0036111 A1 | 2/2009 | Danford et al. | |
| 2009/0044024 A1 | 2/2009 | Oberheide et al. | |
| 2009/0044274 A1 | 2/2009 | Budko et al. | |
| 2009/0083369 A1 | 3/2009 | Marmor | |
| 2009/0083855 A1 | 3/2009 | Apap et al. | |
| 2009/0089879 A1 | 4/2009 | Wang et al. | |
| 2009/0094697 A1 | 4/2009 | Provos et al. | |
| 2009/0125976 A1 | 5/2009 | Wassermann et al. | |
| 2009/0126015 A1 | 5/2009 | Monastyrsky et al. | |
| 2009/0126016 A1 | 5/2009 | Sobko et al. | |
| 2009/0133125 A1 | 5/2009 | Choi et al. | |
| 2009/0158430 A1* | 6/2009 | Borders | G06F 21/552 726/23 |
| 2009/0187992 A1 | 7/2009 | Poston | |
| 2009/0193293 A1 | 7/2009 | Stolfo et al. | |
| 2009/0198651 A1 | 8/2009 | Shiffer et al. | |
| 2009/0198670 A1 | 8/2009 | Shiffer et al. | |
| 2009/0198689 A1 | 8/2009 | Frazier et al. | |
| 2009/0199274 A1 | 8/2009 | Frazier et al. | |
| 2009/0199296 A1 | 8/2009 | Xie et al. | |
| 2009/0228233 A1 | 9/2009 | Anderson et al. | |
| 2009/0241187 A1* | 9/2009 | Troyansky | G06F 21/577 726/22 |
| 2009/0241190 A1 | 9/2009 | Todd et al. | |
| 2009/0265692 A1 | 10/2009 | Godefroid et al. | |
| 2009/0271867 A1 | 10/2009 | Zhang | |
| 2009/0300761 A1 | 12/2009 | Park et al. | |
| 2009/0328185 A1 | 12/2009 | Berg et al. | |
| 2009/0328221 A1 | 12/2009 | Blumfield et al. | |
| 2010/0017546 A1 | 1/2010 | Poo et al. | |
| 2010/0030996 A1 | 2/2010 | Butler, II | |
| 2010/0043073 A1 | 2/2010 | Kuwamura | |
| 2010/0054278 A1 | 3/2010 | Stolfo et al. | |
| 2010/0058474 A1 | 3/2010 | Hicks | |
| 2010/0064044 A1* | 3/2010 | Nonoyama | G06F 21/53 709/226 |
| 2010/0077481 A1 | 3/2010 | Polyakov et al. | |
| 2010/0083376 A1 | 4/2010 | Pereira et al. | |
| 2010/0115621 A1 | 5/2010 | Staniford et al. | |
| 2010/0132038 A1 | 5/2010 | Zaitsev | |
| 2010/0154056 A1 | 6/2010 | Smith et al. | |
| 2010/0192223 A1 | 7/2010 | Ismael | |
| 2010/0251104 A1 | 9/2010 | Massand | |
| 2010/0281102 A1 | 11/2010 | Chinta et al. | |
| 2010/0281541 A1 | 11/2010 | Stolfo et al. | |
| 2010/0281542 A1 | 11/2010 | Stolfo et al. | |
| 2010/0287260 A1 | 11/2010 | Peterson et al. | |
| 2011/0025504 A1 | 2/2011 | Lyon et al. | |
| 2011/0041179 A1* | 2/2011 | Stahlberg | G06F 21/566 726/23 |
| 2011/0047594 A1 | 2/2011 | Mahaffey et al. | |
| 2011/0047620 A1 | 2/2011 | Mahaffey et al. | |
| 2011/0078794 A1 | 3/2011 | Manni et al. | |
| 2011/0093951 A1 | 4/2011 | Aziz | |
| 2011/0099633 A1 | 4/2011 | Aziz | |
| 2011/0099635 A1 | 4/2011 | Silberman et al. | |
| 2011/0113231 A1 | 5/2011 | Kaminsky | |
| 2011/0145920 A1 | 6/2011 | Mahaffey et al. | |
| 2011/0167494 A1* | 7/2011 | Bowen | G06F 21/566 726/24 |
| 2011/0173213 A1 | 7/2011 | Frazier et al. | |
| 2011/0247072 A1 | 10/2011 | Staniford et al. | |
| 2011/0265182 A1 | 10/2011 | Peinado et al. | |
| 2011/0271342 A1* | 11/2011 | Chung | G06F 21/554 726/23 |
| 2011/0307954 A1 | 12/2011 | Melnik et al. | |
| 2011/0307955 A1 | 12/2011 | Kaplan et al. | |
| 2011/0307956 A1* | 12/2011 | Yermakov | H04L 63/0227 726/24 |
| 2011/0314546 A1 | 12/2011 | Aziz et al. | |
| 2012/0079596 A1* | 3/2012 | Thomas | G06F 21/55 726/24 |
| 2012/0084859 A1 | 4/2012 | Radinsky et al. | |
| 2012/0117652 A1 | 5/2012 | Manni et al. | |
| 2012/0144489 A1* | 6/2012 | Jarrett | G06F 21/566 726/24 |
| 2012/0174186 A1 | 7/2012 | Aziz et al. | |
| 2012/0174218 A1 | 7/2012 | McCoy et al. | |
| 2012/0198279 A1 | 8/2012 | Schroeder | |
| 2012/0210423 A1 | 8/2012 | Friedrichs et al. | |
| 2012/0222114 A1* | 8/2012 | Shanbhogue | G06F 21/53 726/22 |
| 2012/0222121 A1 | 8/2012 | Staniford et al. | |
| 2012/0278886 A1 | 11/2012 | Luna | |
| 2012/0297489 A1* | 11/2012 | Dequevy | H04L 63/0227 726/24 |
| 2012/0317644 A1* | 12/2012 | Kumar | G06F 21/552 726/24 |
| 2012/0330801 A1 | 12/2012 | McDougal et al. | |
| 2012/0331553 A1 | 12/2012 | Aziz et al. | |
| 2013/0036470 A1* | 2/2013 | Zhu | H04L 63/0227 726/23 |
| 2013/0036472 A1 | 2/2013 | Aziz | |
| 2013/0047257 A1* | 2/2013 | Aziz | G06F 9/45537 726/24 |
| 2013/0097706 A1 | 4/2013 | Titonis et al. | |
| 2013/0160130 A1 | 6/2013 | Mendelev et al. | |
| 2013/0160131 A1 | 6/2013 | Madou et al. | |
| 2013/0227691 A1* | 8/2013 | Aziz | G06F 21/567 726/24 |
| 2013/0246370 A1 | 9/2013 | Bartram et al. | |
| 2013/0247186 A1 | 9/2013 | LeMasters | |
| 2013/0263260 A1 | 10/2013 | Mahaffey et al. | |
| 2013/0291109 A1 | 10/2013 | Staniford et al. | |
| 2013/0298243 A1 | 11/2013 | Kumar et al. | |
| 2013/0318038 A1 | 11/2013 | Shiffer et al. | |
| 2013/0318073 A1 | 11/2013 | Shiffer et al. | |
| 2013/0325791 A1 | 12/2013 | Shiffer et al. | |
| 2013/0325792 A1 | 12/2013 | Shiffer et al. | |
| 2013/0325871 A1 | 12/2013 | Shiffer et al. | |
| 2013/0325872 A1 | 12/2013 | Shiffer et al. | |
| 2014/0032875 A1 | 1/2014 | Butler | |
| 2014/0053260 A1 | 2/2014 | Gupta et al. | |
| 2014/0053261 A1 | 2/2014 | Gupta et al. | |
| 2014/0096229 A1* | 4/2014 | Burns | H04L 63/1491 726/15 |
| 2014/0115578 A1* | 4/2014 | Cooper | G06F 21/606 718/1 |
| 2014/0181131 A1 | 6/2014 | Ross | |
| 2014/0189687 A1 | 7/2014 | Jung et al. | |
| 2014/0189866 A1 | 7/2014 | Shiffer et al. | |
| 2014/0189882 A1 | 7/2014 | Jung et al. | |
| 2014/0237600 A1 | 8/2014 | Silberman et al. | |
| 2014/0280245 A1 | 9/2014 | Wilson | |
| 2014/0283037 A1 | 9/2014 | Sikorski et al. | |
| 2014/0283063 A1 | 9/2014 | Thompson et al. | |
| 2014/0337836 A1 | 11/2014 | Ismael | |
| 2014/0344926 A1 | 11/2014 | Cunningham et al. | |
| 2014/0380473 A1 | 12/2014 | Bu et al. | |
| 2014/0380474 A1 | 12/2014 | Paithane et al. | |
| 2015/0007312 A1 | 1/2015 | Pidathala et al. | |
| 2015/0096022 A1 | 4/2015 | Vincent et al. | |
| 2015/0096023 A1 | 4/2015 | Mesdaq et al. | |
| 2015/0096024 A1 | 4/2015 | Haq et al. | |
| 2015/0096025 A1* | 4/2015 | Ismael | G06F 21/566 726/23 |
| 2015/0180886 A1 | 6/2015 | Staniford et al. | |
| 2015/0186645 A1 | 7/2015 | Aziz et al. | |
| 2015/0220735 A1 | 8/2015 | Paithane et al. | |

(56) References Cited

U.S. PATENT DOCUMENTS

2015/0372980 A1   12/2015   Eyada
2016/0044000 A1   2/2016   Cunningham
2016/0127393 A1   5/2016   Aziz et al.

FOREIGN PATENT DOCUMENTS

| WO | 0223805 | A2 | 3/2002 |
| WO | 2007117636 | A2 | 10/2007 |
| WO | 2008041950 | A2 | 4/2008 |
| WO | 2011084431 | A2 | 7/2011 |
| WO | 2012145066 | A1 | 10/2012 |

OTHER PUBLICATIONS

Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Appl. No. 13/801,573, filed Mar. 13, 2013 Final Office Action dated Dec. 12, 2014.
U.S. Appl. No. 13/801,573, filed Mar. 13, 2013 Final Office Action dated Oct. 13, 2015.
U.S. Appl. No. 13/801,573, filed Mar. 13, 2013 Non-Final Office Action dated Apr. 20, 2016.
U.S. Appl. No. 13/801,573, filed Mar. 13, 2013 Non-Final Office Action dated Jun. 10, 2015.
U.S. Appl. No. 13/801,573, filed Mar. 13, 2013 Non-Final Office Action dated May 13, 2014.
U.S. Appl. No. 15/425,954, filed Feb. 6, 2017 Non-Final Office Action dated Jun. 5, 2017.
U.S. Appl. No. 15/425,954, filed Feb. 6, 2017 Notice of Allowance dated Nov. 22, 2017.
Venezia, Paul, "NetDetector Captures Intrusions", InfoWorld Issue 27, ("Venezia"), (Jul. 14, 2003).
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC conference, Las Vegas, NV, USA, (Dec. 2002), pp. 1-9.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/article/Details.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?Itag=ody&pg=aq&aqmode=aqa=Event+Orch- esrator , (Accessed on Sep. 3, 2009).
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Safford, Paul, and Mike Blodgett. "Toward Botnet Mesocosms." HotBots 7 (2007): 6-6.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco, Configuring the Catalyst Switched Port Analyzer (SPAN) ("Cisco"), (1992).
Clark, John, Sylvain Leblanc, and Scott Knight. "Risks associated with usb hardware trojan devices used by insiders." Systems Conference (SysCon), 2011 IEEE International. IEEE, 2011.
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Crawford, Martin, and Gilbert Peterson. "Insider Threat Detection using Virtual Machine Introspection." System Sciences (HICSS), 2013 46th Hawaii International Conference on. IEEE, 2013.
Deutsch, P., "Zlib compressed data format specification version 3.3" RFC 1950, (1996).
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric, et al., "Combinatorial Optimisation of Worm Propagation on an Unknown Network", International Journal of Computer Science 2.2 (2007).
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 12 Issue 3, pp. 21-28.
Hljelmvik, Erik, "Passive Network Security Analysis with NetworkMiner", (IN)Secure, Issue 18, (Oct. 2008), pp. 1-100.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational Intelligence and Security (CIS), 2011 Seventh International Conference on. IEEE, 2011.
Kaeo, Merike, "Designing Network Security", ("Kaeo"), (Nov. 2003).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).

(56) References Cited

OTHER PUBLICATIONS

Korczynski, Maciej, Gilles Berger-Sabbatel, and Andrzej Duda. "Two Methods for Detecting Malware." Multimedia Communications, Services and Security. Springer Berlin Heidelberg, 2013. 95-106.

Krasnyansky, Max, et al., Universal Tunttap driver, available at https://www.kernel.org/doc/Documentation/networking/tuntap.txt (2002) ("Krasnyansky").

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Liljenstam, Michael, et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Reiner Sailer, Enriquillo Valdez, Trent Jaeger, Roonald Perez, Leendert van Doorn, John Linwood Griffin, Stefan Berger, sHype: Secure Hypervisor Appraoch to Trusted Virtualized Systems (Feb. 2, 2005) ("Sailer").

\* cited by examiner

SYSTEM AND METHOD FOR DETECTING EXFILTRATION CONTENT

This is a Continuation application claiming the benefit of priority on U.S. patent application Ser. No. 15/425,954 filed Feb. 6, 2017, now U.S. Pat. No. 9,934,381 issued Apr. 3, 2018, which is a continuation of U.S. patent application Ser. No. 13/801,573 filed Mar. 13, 2013, now U.S. Pat. No. 9,565,202 issued Feb. 7, 2017, which is incorporated by reference in its entirety.

FIELD OF THE INVENTION

Embodiments of the present invention relate generally to malicious content detection. More particularly, embodiments of the invention relate to detecting exfiltration content.

BACKGROUND

Malicious software, or malware for short, may include any program or file that is harmful by design to a computer. Malware includes computer viruses, worms, Trojan horses, adware, spyware, and any programming that gathers information about a computer or its user or otherwise operates without permission. The owners of the computers are often unaware that these programs have been added to their computers and are often similarly unaware of their function.

Malicious network content is a type of malware distributed over a network via websites, e.g., servers operating on a network according to a hypertext transfer protocol (HTTP) standard or other well-known standard. Malicious network content distributed in this manner may be actively downloaded and installed on a computer, without the approval or knowledge of its user, simply by the computer accessing the web site hosting the malicious network content (the "malicious web site"). Malicious network content may be embedded within objects associated with web pages hosted by the malicious web site. Malicious network content may also enter a computer on receipt or opening of email. For example, email may contain an attachment, such as a PDF document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time malware is detected by the scanning software, some damage on the computer or loss of privacy may have already occurred, and the malware may have propagated from the infected computer to other computers. Additionally, it may take days or weeks for new signatures to be manually created, the scanning signature library updated and received for use by the scanning software, and the new signatures employed in new scans.

Moreover, anti-virus scanning utilities may have limited effectiveness to protect against all exploits by polymorphic malware. Polymorphic malware has the capability to mutate to defeat the signature match process while keeping its original malicious capabilities intact. Signatures generated to identify one form of a polymorphic virus may not match against a mutated form. Thus polymorphic malware is often referred to as a family of virus rather than a single virus, and improved anti-virus techniques to identify such malware families is desirable.

Another type of malware detection solution employs virtual environments to replay content within a sandbox established by virtual machines (VMs). Such solutions monitor the behavior of content during execution to detect anomalies that may signal the presence of malware. One such system offered by FireEye, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are replayed within one or more virtual machines. For example, if a user is trying to download a file over a network, the file is extracted from the network traffic and analyzed in the virtual machine. The results of the analysis aids in determining whether the file is malicious. The two-phase malware detection solution may detect numerous types of malware and, even malware missed by other commercially available approaches. Through verification, the two-phase malware detection solution may also achieve a significant reduction of false positives relative to such other commercially available approaches. Dealing with false positives in malware detection may needlessly slow or interfere with download of network content or receipt of email, for example. This two-phase approach has even proven successful against many types of polymorphic malware and other forms of advanced persistent threats.

Data loss/leak prevention solution is a system that is designed to detect potential data breach/data exfiltration transmissions and prevent them by monitoring, detecting & blocking sensitive data while in-use (endpoint actions), in-motion (network traffic), and at-rest (data storage). In data leakage incidents, sensitive data is disclosed to unauthorized personnel either by malicious intent or inadvertent mistake. Such sensitive data can come in the form of private or company information, intellectual property (IP), financial or patient information, credit-card data, and other information depending on the business and the industry. However, such a system is not capable of detecting a malware that performs data exfiltration before it causes damage.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
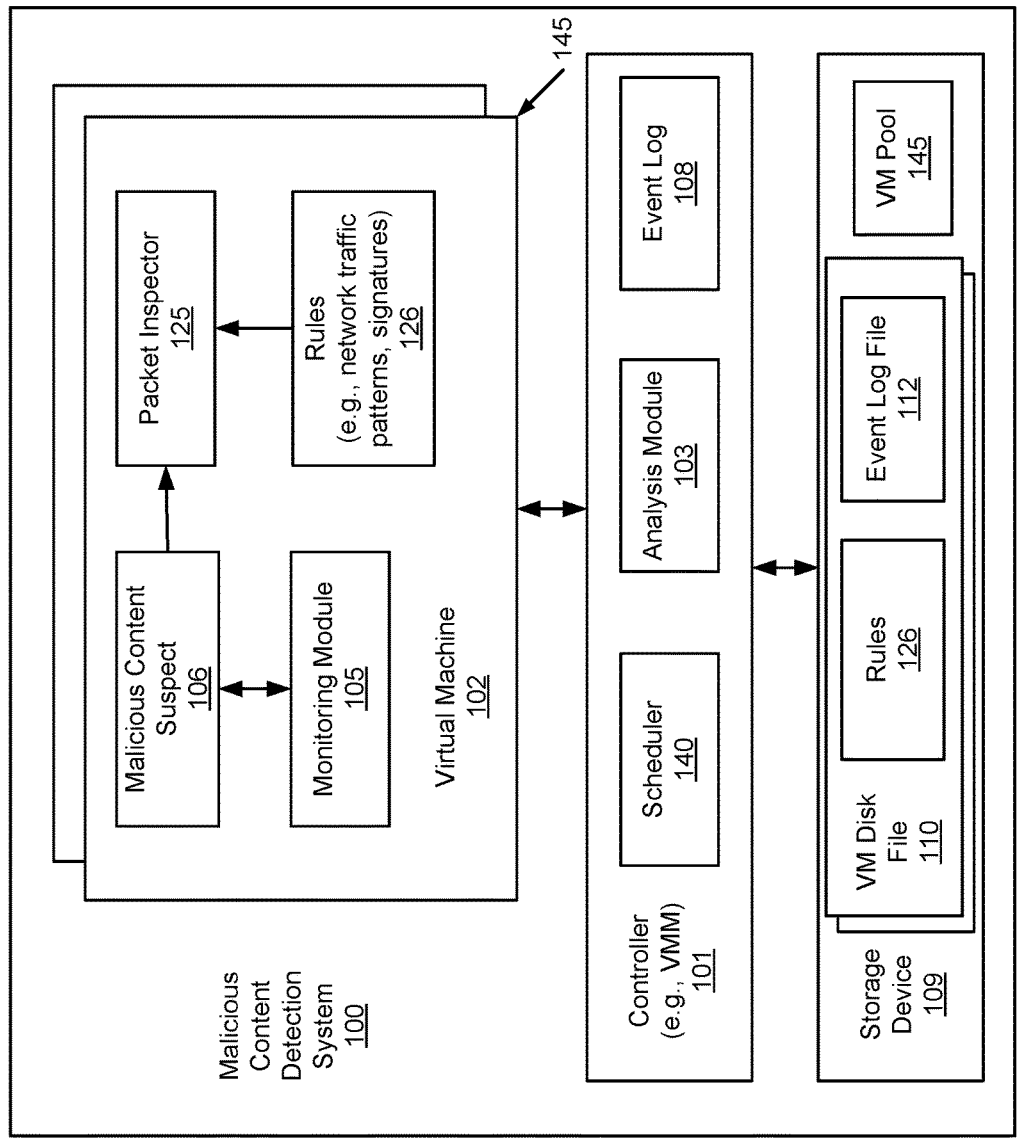
FIG. 1 is a block diagram illustrating a malicious content detection system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for detecting exfiltration content are described herein. According to some embodiments, a malicious content suspect is executed within a virtual machine (or other designated operating environments such as a sandboxed environment) that simulates or mimics a target operating environment that will likely cause the malicious content suspect to generate malicious indicators and activity. A malicious content suspect refers to any suspicious content that is likely malicious. A packet inspector is configured to monitor and inspect the outbound network traffic originated from an application used to render/display/run the malicious content suspect (if applicable) within the VM to determine whether the malicious content suspect is designed to perform content exfiltration or generic data theft. If so, the malicious content suspect may be declared as malicious.

The packet inspection may be performed by capturing the outbound network traffic upon detecting the malicious content suspect's callback (e.g., upon content render/load/execution, the operating system of the victim is compromised and the content instructs the operating system to transmit packets back the content/malware author, so that a clandestine channel is established, which allows the content/malware author to effectively take ownership of the victim system remotely for further nefarious purposes). The packet inspector searches and compares the content of the packets against predetermined network traffic patterns or signatures. In one embodiment, the packet inspector is configured to search the outbound network traffic emitted by the VM to a fake network that is isolated from connectivity to real assets external to the VM, in order to determine whether the outbound network traffic contains any machine or operating environment identifying information that identifies certain unique or almost unique characteristics of the virtual machine (e.g., a machine or computer identifier (ID), or user ID). If the outbound network traffic includes content that matches the predetermined network traffic patterns or signatures, an alert may be generated indicating that the malicious content suspect should be declared as malicious. Since the malicious content suspect is executed within an effectively isolated VM, the actual exfiltration content would not actually be transmitted to an external network. As a result, the malicious content suspect can be determined whether it is likely malicious without running a risk of causing damage to real enterprise assets or signaling to the malware author that such analysis was performed.

FIG. 1 is a block diagram illustrating a malicious content detection system according to one embodiment of the invention. Referring to FIG. 1, system 100 includes controller 101 to manage or control one or more virtual machines (VMs) 102 (also referred to as a sandboxed operating environment or simply a sandbox), where content associated with VMs 102 are stored in storage device 109 in a form of VM disk files 110.

Controller 101 may be implemented as part of a VM monitor or manager (VMM), also referred to as a hypervisor for managing or monitoring VMs, which may be hosted by a host operating system (OS). VM 102 may be hosted by a guest OS. The host OS and the guest OS may be the same type of operating systems or different types of operating systems (e.g., Windows™, Linux™, Unix™, Mac OS™, iOS™, etc.) or different versions thereof. A VM is a simulation of a machine (abstract or real) that is usually different from the target machine (where it is being simulated on). Virtual machines may be based on specifications of a hypothetical computer or emulate the computer architecture and functions of a real world computer. A virtual machine referred to herein can be any type of virtual machines, such as, for example, hardware emulation, full virtualization, para-virtualization, and operating system-level virtualization virtual machines.

According to one embodiment, when malicious content suspect 106 is received for a dynamic content analysis (as opposed to be a static content analysis described below), a scheduler 140 of controller 101 is configured to identify and select a VM, in this example VM 102, from a VM pool 145 that has been configured to closely simulate a target operating environment (e.g., particular version of an OS with particular versions of certain software installed therein) in which malicious content suspect 106 is to be analyzed. A malicious content suspect refers to any suspicious content that is likely malicious. The scheduler 140 then launches VM 102 in which monitoring module 105 is running within VM 102 and configured to monitor activities and behavior of malicious content suspect 106.

In addition, monitoring module 105 maintains a persistent communication channel with analysis module 103 of controller 101 to communicate certain events or activities of malicious content suspect 106 during the execution. In response to detecting certain predetermined events triggered by malicious content suspect 106, monitoring module 105 is configured to send a message via the communication channel to analysis module 103, where the message may be recorded as part of event log 108. The message may include information identifying an event triggered by malicious content suspect 106. Event log 108 records events that have been selectively monitored and detected by monitoring module 103, such as, for example, certain network activity events. Content of the event log 108 may be stored in a persistent storage as part of event log file(s) 112 of VM disk file 110 associated with VM 102. The recorded events may be analyzed by analysis module 103 based on a set of rules or policies (not shown) to determine whether malicious content suspect 106 is likely malicious (e.g., high probability of malicious) and/or should be declared as malicious.

In one embodiment, in response to some predetermined events (e.g., file creation, registry access, DLL loading, process execution, power management such as sleep) triggered by malicious content suspect 106, monitoring module 105 sends a message describing the event(s) via a communication channel to controller 101, which may be recorded as part of event log 108. Event log 108 may be further cached in a persistent storage as part of event log file(s) 112.

According to one embodiment, a packet inspector 125 is configured to monitor and inspect the outbound network traffic originated from the malicious content suspect 106 within the VM 102 to determine whether the malicious content suspect 106 performs specific content exfiltration or generic data theft. The packet inspection may be performed by capturing the outbound network traffic upon detecting the malicious content suspect's callback (e.g., transmitting packets back the original content/malware author to signal that the OS has been compromised and ready to be remotely controlled). The packet inspector 125 searches and compares the content of the packets against predetermined network traffic patterns or signatures as part of rules 126. In one embodiment, the packet inspector 125 is configured to search the outbound network traffic to determine whether the outbound network traffic contains any machine or operating environment identifying information that identifies certain unique or almost unique characteristics of the virtual machine 102 (e.g., a computer or machine identifier, or user identifier). If the outbound network traffic includes content that matches the predetermined network traffic patterns or signatures 126, an alert may be generated indicating that the malicious content suspect 106 may be declared as malicious.

Figure 2:
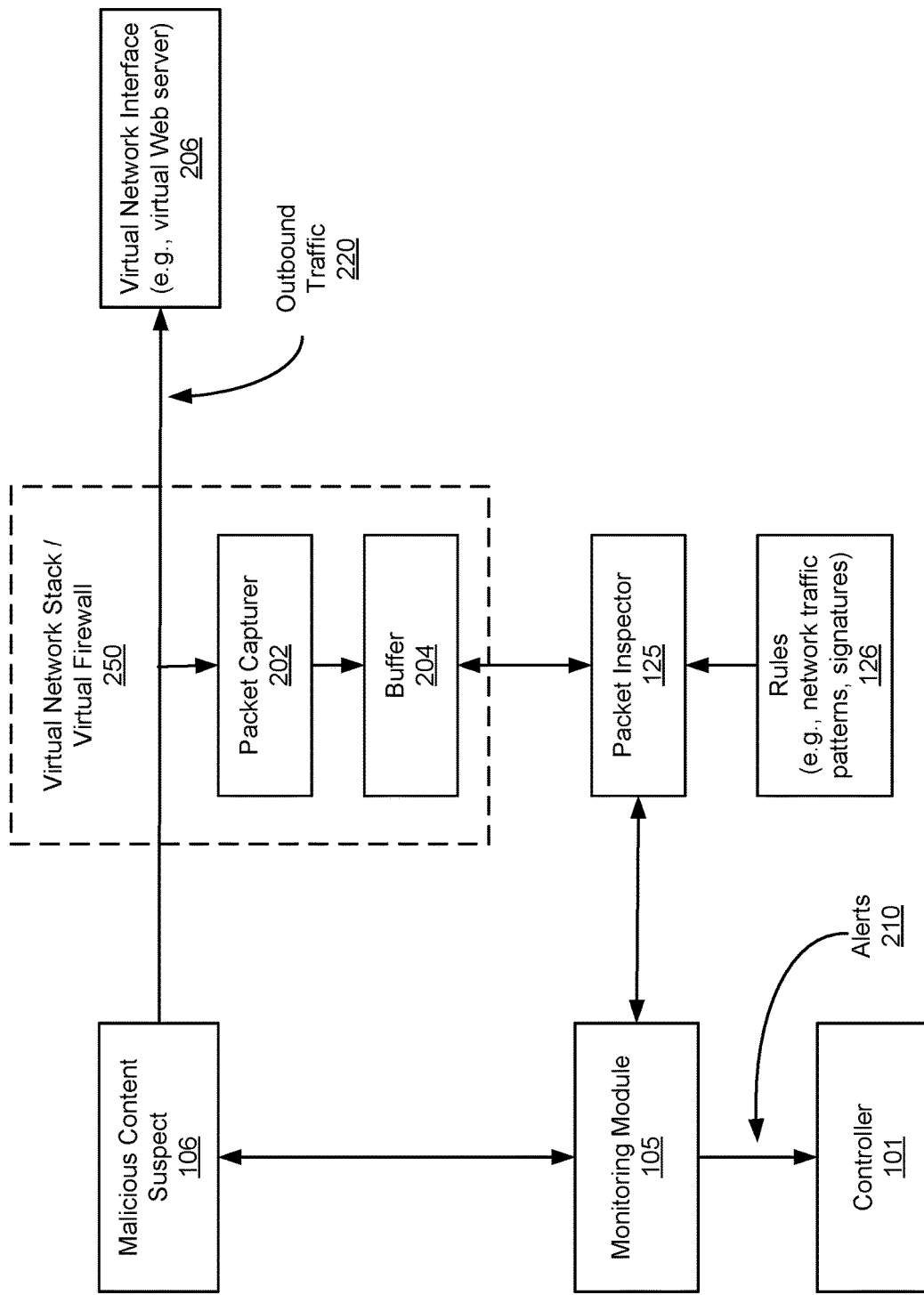
FIG. 2 is a block diagram illustrating a system for detecting exfiltration content according to one embodiment.

FIG. 2 is a block diagram illustrating a system for detecting exfiltration content according to one embodiment. The system as shown in FIG. 2 may be implemented as part of malicious content detection system 100 of FIG. 1. Referring to FIG. 2, in this example, a packet capturer 202 is configured to monitor at least the outbound network traffic 220 initiated by malicious content suspect 106. Packet capturer 202 may be implemented as part of a network stack (e.g., TCP/IP stack) and/or within a firewall 250 of a guest operating system that hosts a VM in which malicious content suspect 106 is executed. The captured packets may be temporarily stored in buffer 204 and analyzed by packet inspector 125 based on a set of rules 126. Rules 126 represent a set of predefined system characteristics, network traffic patterns, and/or signatures, etc. If certain content of the outbound network traffic 220 matches at least some of the data in rules 126, packet inspector 125 may notify monitoring module 105 to send an alert 210 to controller 101. Alternatively, packet inspector 125 may send the alert 210 to controller 101 directly. Packet inspector 125 and/or rules 126 may also be implemented as part of network stack/firewall 250. Packet capturer 202 and packet inspector 125 may be integrated as a single unit. Packet capturer 202 and packet inspector 125 may be implemented in any one or more of the layers of a network stack, such as, an application layer, a transport control protocol (TCP) layer, an Internet protocol (IP) layer, and/or a media access control (MAC) layer, etc.

In one embodiment, upon detecting outbound malicious network activity (i.e., callback), packet inspector 125 identifies the computer name or NetBIOS name of the VM in which malicious content suspect 106 is running. NetBIOS (network basic input/output system) services related to the session layer of the Open Systems Interconnection (OSI) model allowing applications on separate computers to communicate over a local area network. The session layer of the OSI model controls the dialogues (connections) between computers. It establishes, manages, and terminates the connections between the local and remote application. It provides for full-duplex, half-duplex, or simplex operation, and establishes checkpointing, adjournment, termination, and restart procedures. The OSI model made this layer responsible for graceful close of sessions, which is a property of the Transmission Control Protocol, and also for session checkpointing and recovery, which is not usually used in the Internet Protocol Suite. The session layer is commonly implemented explicitly in application environments that use remote procedure calls.

The name used for malware detection can be used as a string, which can be encoded, and then used to scan subsequent suspicious content generated by the malicious content suspect 106. More specifically, the string can be encoded/compressed using standard reversible algorithms, for example, exclusive OR (XOR), BASE64, or ZLIB compression algorithm, any other commonly used encoding algorithms or methods. The encoded/compressed string can then be used to perform a search in the outbound network traffic 220, where a match indicates potential exfiltration of sensitive content from the malicious content suspect 106. This approach does not require knowledge of any password credentials previously stored on the VM.

However, this technique assumes computer names or NetBIOS names that are unique enough such that the encoded/compressed forms of this data do not match on generic network traffic, which may lead to false positives. In one embodiment, a switch mechanism can be used by a system user or system administrator to activate/enable or deactivate/disable this feature via at least an appropriate command line action or other user interface action.

According to one embodiment, packet inspector 125 and/or packet capturer 202 can perform real-time traffic analysis and packet logging on IP networks. They can perform protocol analysis, content searching, and content matching. They can also be used to detect probes or attacks, including, but not limited to, operating system fingerprinting attempts, common gateway interface, buffer overflows, server message block probes, and stealth port scans. The packet inspector 125 and/or packet capturer 202 read network packets (e.g., outbound traffic packets), log packets to a storage device, and monitor network traffic and analyze it against rules 126. The packet capturing and inspection can be performed automatically without user interaction or knowledge.

In this example, the virtual network interface 206 is configured to simulate a physical network interface, such as a network interface card, a network gateway device of a local area network (LAN), or a remote node such as a Web server, that the malicious content suspect 106 would normally access. The virtual network interface 206 may be a virtual network interface of the same VM or alternatively, the virtual network interface may be represented by another VM hosted by the same host operating system or VMM 101 of FIG. 1. Since the malicious content suspect 106 is contained or sandboxed within a VM, it cannot actually access an external network (e.g., Internet), the malware detection can be performed without the knowledge of the original author of the malicious content suspect 106. As a result, the malware author cannot collect the malware detection information or interfere with the malware detection process for the purpose of avoiding being detected in the future.

According to one embodiment, packet inspector 126 scans captured packets stored in buffer 204 to search for certain patterns or signatures predefined in rules 126 to determine whether the packets include certain identifying information that identifies a machine represented by the VM.

The identifying information may include the unique or almost unique environmental properties of the VM, such as, for example, a computer name or NetBIOS name, hardware identifying information (e.g., hardware identifiers such as serial numbers for processor, motherboard, basic input/ output system (BIOS), network interface, and/or storage device), application identifying information (e.g., software product IDs), and/or user identifying information (e.g., username or user ID, security ID). Note that the packet capturer 202 and packet inspector 125 may be activated or deactivated via a command. For example, an administrator can issue a command, for example, via a command line interface (CLI) or a user interface, to deactivate the packet capturing and packet inspection if the false positive rate is above a predetermined threshold.

In cases where legitimate, pre-installed applications within the VM emit similar unique or almost unique environmental information out on the network, the system will profile this "background traffic" when the VM has not yet processed any initial malicious content suspect and "train" the packet inspector 125 through specific exclusion rules within 126, so that this "background traffic" does not yield any subsequent false positive alerts 210.

Figure 3:
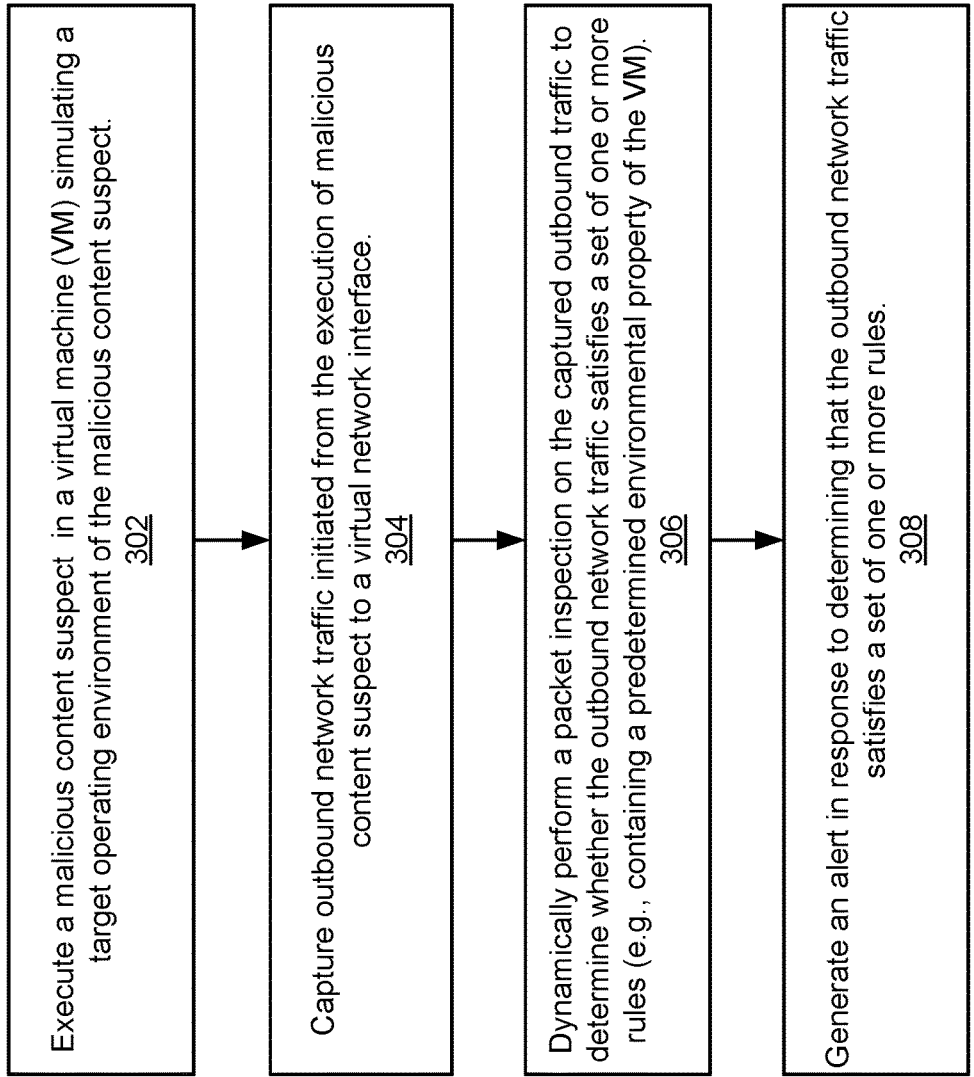
FIG. 3 is a flow diagram illustrating a method for detecting exfiltration content according to one embodiment of the invention.

FIG. 3 is a flow diagram illustrating a method for detecting exfiltration content according to one embodiment of the invention. The method as shown in FIG. 3 may be performed by system 100 of FIG. 1 or the system of FIG. 2, which may include processing logic in hardware, software, or a combination thereof. Referring to FIG. 3, at block 302, processing logic launches and executes malicious content suspect in a virtual machine that is configured to simulate a target operating environment associated with the malicious content suspect. At block 304, processing logic monitors and captures outbound network traffic that is initiated as a result of executing/rendering/loading from execution of the malicious content suspect to a virtual network interface (e.g., virtual network interface card or a virtual Web server). At block 306, processing logic dynamically performs a packet inspection on the captured outbound network traffic to determine whether the outbound network traffic satisfies a set of one or more rules (e.g., containing a predetermined environmental property of the VM). In one embodiment, the processing logic scans and analyzes the packets to search for certain system identifying information such as machine, hardware, software, and user identifying information that matches a set of predefined patterns or signatures. If a match is found, an alert is generated indicating that the malicious content suspect may be considered or declared as malicious.

Figure 4:
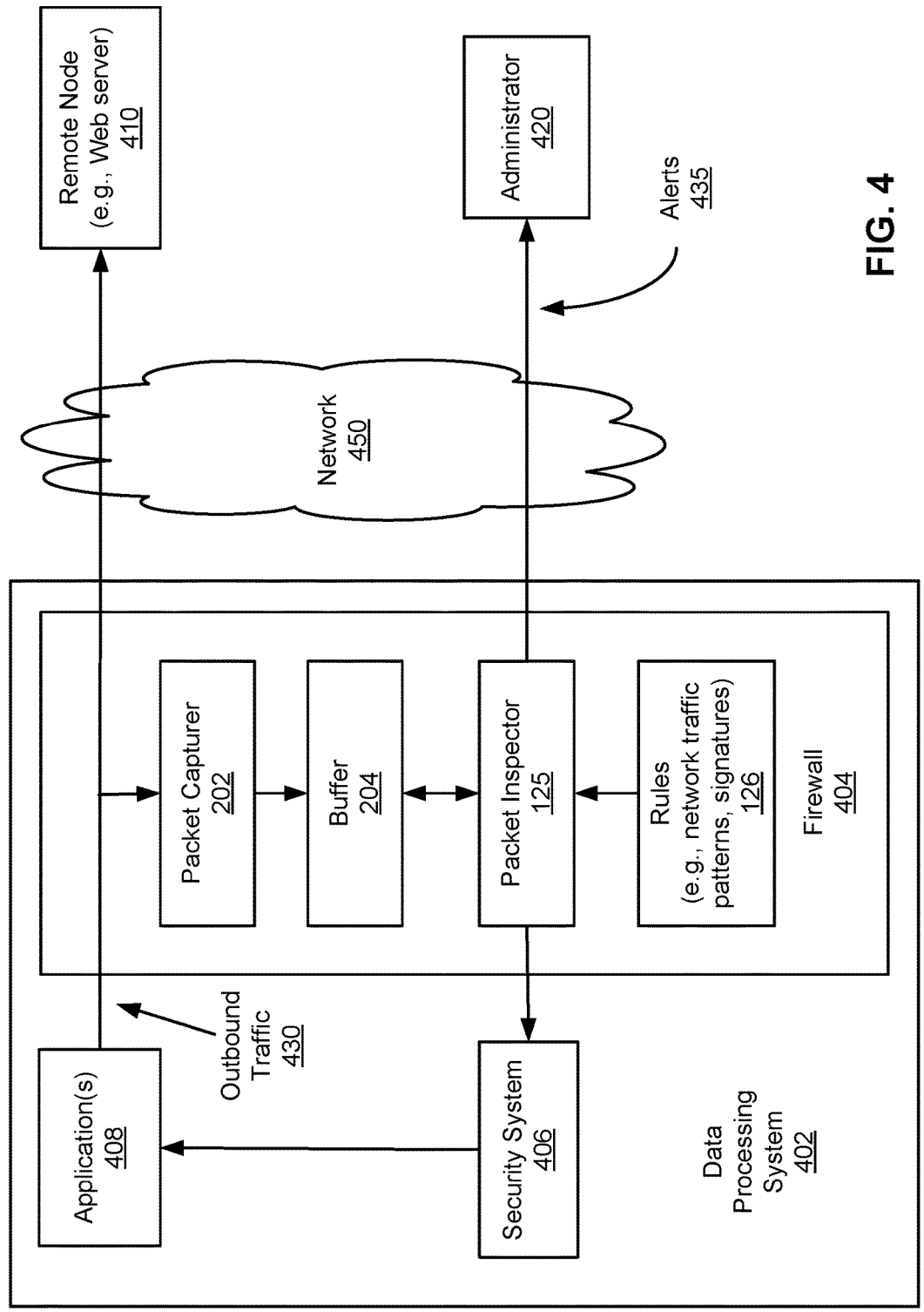
FIG. 4 is a block diagram illustrating a system configuration for detecting exfiltration content according to another embodiment of the invention.

According to some embodiments, the techniques described above can also be applied in real time within an actual production machine instead of a simulated operating environment such as a virtual machine. FIG. 4 is a block diagram illustrating a system configuration for detecting exfiltration content according to another embodiment of the invention. Referring to FIG. 4, in this example, packet capturer 202 and packet inspector 125 are implemented as part of firewall 404 or any of the network layers in a network stack (not shown). Firewall 404 may be part of an operating system of data processing system 402. Alternatively, firewall 404 may be implemented in a gateway device or router associated with a LAN in which data processing system 402 is a member.

A firewall can either be software-based or hardware-based and is used to help keep a network secure. Its primary objective is to control the incoming and outgoing network traffic by analyzing the data packets and determining whether it should be allowed through or not, based on a predetermined rule set. A network's firewall builds a bridge between the internal network or computer it protects, upon securing that the other network is secure and trusted, usually an external (inter)network, such as the Internet, that is not assumed to be secure and trusted. Many personal computer operating systems include software-based firewalls to protect against threats from the public Internet. Many routers that pass data between networks contain firewall components and, conversely, many firewalls can perform basic routing functions.

In one embodiment, packet capturer 202 and packet inspector 125 are configured to capture and analyze the outbound network traffic 430 initiated from an application such as application(s) 408. The outbound network traffic may be sent to a remote node such as remote Web server 410 over network 450. Network 450 may be a LAN, a wide area network (WAN), or a combination thereof.

According to one embodiment, packet inspector 125 dynamically scans packets captured by packet capturer 202 and stored in buffer 204 to search for certain patterns or signatures predefined in rules 126 to determine whether the packets include certain identifying information that identifies the real machine on the internal enterprise network which is running the application 408 that appears to be processing malicious content suspect. The identifying information may include the unique or almost unique environmental properties of the real machine on the internal enterprise network, such as, for example, a computer name or NetBIOS name, hardware identifying information (e.g., hardware identifiers such as serial numbers for processor, motherboard, basic input/output system (BIOS), network interface, and/or storage device), application identifying information (e.g., software product IDs), and/or user identifying information (e.g., username or user ID, security ID). Note that the packet capturer 202 and packet inspector 125 may also be activated/enabled or deactivated/disabled via a command. For example, an administrator can issue a command, for example, via a CLI or a user interface, to deactivate the packet capturing and packet inspection if the false positive rate is too high.

If certain content of the outbound network traffic 430 matches at least some of the data in rules 126, according to one embodiment, packet inspector 125 sends an alert 435 to administrator 420. In addition, since the outbound traffic may reach the intended destination 410, packet inspector 125 may further communicate with security system 406 to contain or shut down the suspect application 408 or machine 408 or alternatively, cause firewall 404 to block any further network traffic, inbound and/or outbound traffic, associated with the suspect application 408 or machine 408. Security system 406 may be part of a network intrusion detection system and/or network intrusion prevention system.

Figure 5:
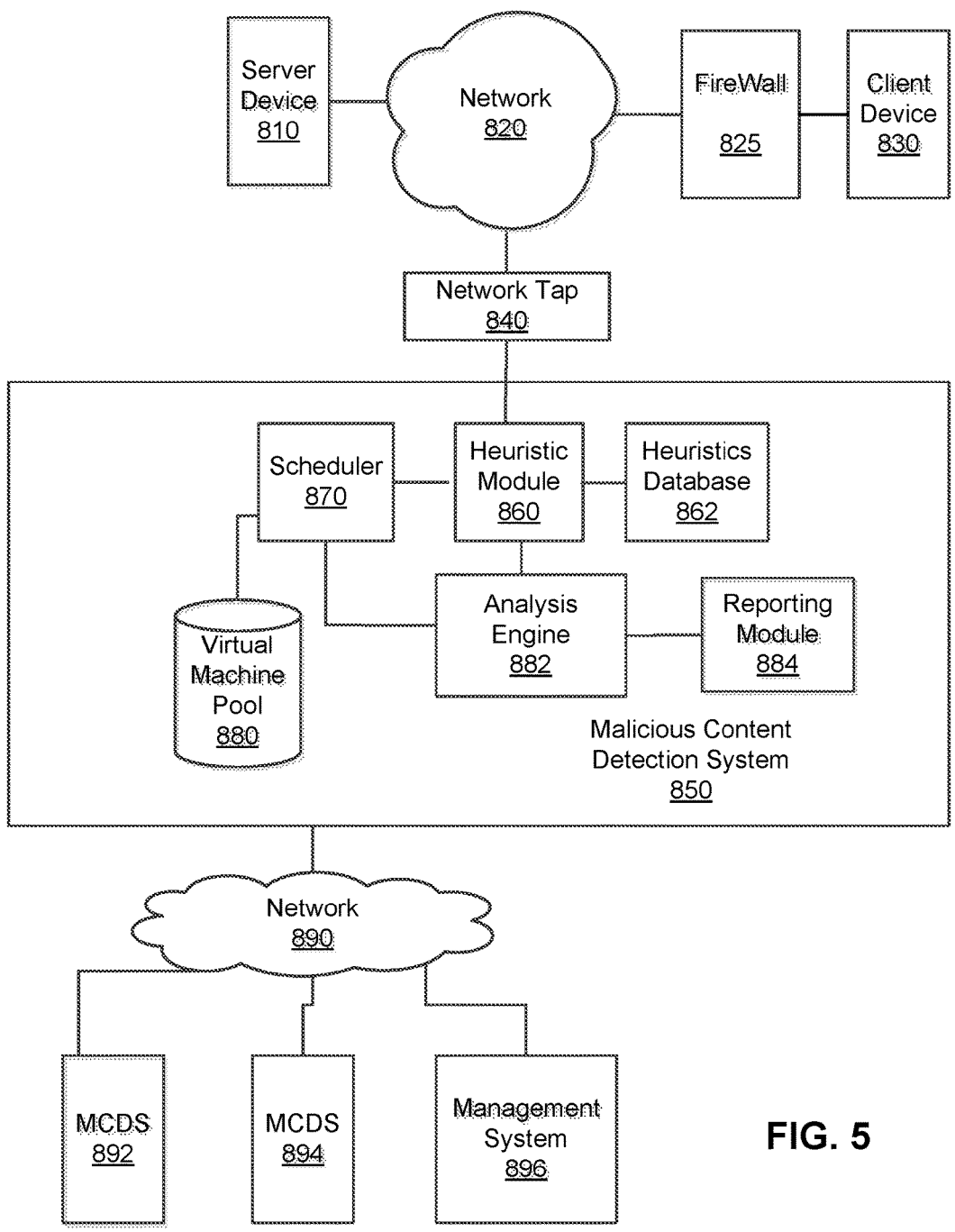
FIG. 5 is a block diagram of a computer network system deploying a malicious content detection system according to one embodiment of the invention.

FIG. 5 is a block diagram of an illustrative computer network system having a malicious content detection system 850 in accordance with a further illustrative embodiment. The malicious content detection system 850 may represent any of the malicious content detection systems described above, such as, for example, detection system 100 of FIG. 1. The malicious content detection system 850 is illustrated with a server device 810 and a client device 830, each coupled for communication via a communication network 820. In various embodiments, there may be multiple server devices and multiple client devices sending and receiving data to/from each other, and the same device can serve as either a server or a client in separate communication sessions. Although FIG. 5 depicts data transmitted from the server device 810 to the client device 830, either device can transmit and receive data from the other.

Note that throughout this application, network content is utilized as an example of content for malicious content detection purposes; however, other types of content can also be applied. Network content may include any data transmitted over a network (i.e., network data). Network data may include text, software, images, audio, or other digital data. An example of network content includes web content, or any network data that may be transmitted using a Hypertext Transfer Protocol (HTTP), Hypertext Markup Language (HTML) protocol, or be transmitted in a manner suitable for display on a Web browser software application. Another example of network content includes email messages, which may be transmitted using an email protocol such as Simple Mail Transfer Protocol (SMTP), Post Office Protocol version 3 (POP3), or Internet Message Access Protocol (IMAP4). A further example of network content includes Instant Messages, which may be transmitted using an Instant Messaging protocol such as Session Initiation Protocol (SIP) or Extensible Messaging and Presence Protocol (XMPP). In addition, network content may include any network data that is transferred using other data transfer protocols, such as File Transfer Protocol (FTP).

The malicious network content detection system 850 may monitor exchanges of network content (e.g., Web content) in real-time rather than intercepting and holding the network content until such time as it can determine whether the network content includes malicious network content. The malicious network content detection system 850 may be configured to inspect exchanges of network content over the communication network 820, identify suspicious network content, and analyze the suspicious network content using a virtual machine to detect malicious network content. In this way, the malicious network content detection system 850 may be computationally efficient and scalable as data traffic volume and the number of computing devices communicating over the communication network 820 increase. Therefore, the malicious network content detection system 850 may not become a bottleneck in the computer network system.

The communication network 820 may include a public computer network such as the Internet, in which case a firewall 825 may be interposed between the communication network 820 and the client device 830. Alternatively, the communication network may be a private computer network such as a wireless telecommunication network, wide area network, or local area network, or a combination of networks. Though the communication network 820 may include any type of network and be used to communicate different types of data, communications of web data may be discussed below for purposes of example.

The malicious network content detection system 850 is shown as coupled with the network 820 by a network tap 840 (e.g., a data/packet capturing device). The network tap 840 may include a digital network tap configured to monitor network data and provide a copy of the network data to the malicious network content detection system 850. Network data may comprise signals and data that are transmitted over the communication network 820 including data flows from the server device 810 to the client device 830. In one example, the network tap 840 monitors and copies the network data without an appreciable decline in performance of the server device 810, the client device 830, or the communication network 820. The network tap 840 may copy any portion of the network data, for example, any number of data packets from the network data. In embodiments where the malicious content detection system 850 is implemented as an dedicated appliance or a dedicated computer system, the network tap 840 may include an assembly integrated into the appliance or computer system that includes network ports, network interface card and related logic (not shown) for connecting to the communication network 820 to non-disruptively "tap" traffic thereon and provide a copy of the traffic to the heuristic module 860. In other embodiments, the network tap 840 can be integrated into a firewall, router, switch or other network device (not shown) or can be a standalone component, such as an appropriate commercially available network tap. In virtual environments, a virtual tap (vTAP) can be used to copy traffic from virtual networks.

The network tap 840 may also capture metadata from the network data. The metadata may be associated with the server device 810 and/or the client device 830. For example, the metadata may identify the server device 810 and/or the client device 830. In some embodiments, the server device 810 transmits metadata which is captured by the tap 840. In other embodiments, a heuristic module 860 (described herein) may determine the server device 810 and the client device 830 by analyzing data packets within the network data in order to generate the metadata. The term, "content," as used herein may be construed to include the intercepted network data and/or the metadata unless the context requires otherwise.

The malicious network content detection system 850 may include a heuristic module 860, a heuristics database 862, a scheduler 870, a virtual machine pool 880, an analysis engine 882 and a reporting module 884. In some embodiments, the network tap 840 may be contained within the malicious network content detection system 850.

The heuristic module 860 receives the copy of the network data from the network tap 840 and applies heuristics to the data to determine if the network data might contain suspicious network content. The heuristics applied by the heuristic module 860 may be based on data and/or rules stored in the heuristics database 862. The heuristic module 860 may examine the image of the captured content without executing or opening the captured content. For example, the heuristic module 860 may examine the metadata or attributes of the captured content and/or the code image (e.g., a binary image of an executable) to determine whether a certain portion of the captured content matches a predetermined pattern or signature that is associated with a particular type of malicious content. In one example, the heuristic module 860 flags network data as suspicious after applying a heuristic analysis. This detection process is also referred to as a static malicious content detection. The suspicious network data may then be provided to the scheduler 870. In some embodiments, the suspicious network data is provided directly to the scheduler 870 with or without buffering or organizing one or more data flows.

When a characteristic of the packet, such as a sequence of characters or keyword, is identified that meets the conditions of a heuristic, a suspicious characteristic of the network content is identified. The identified characteristic may be stored for reference and analysis. In some embodiments, the entire packet may be inspected (e.g., using deep packet inspection techniques) and multiple characteristics may be identified before proceeding to the next step. In some embodiments, the characteristic may be determined as a result of an analysis across multiple packets comprising the network content. A score related to a probability that the suspicious characteristic identified indicates malicious network content is determined.

The heuristic module 860 may also provide a priority level for the packet and/or the features present in the packet. The scheduler 870 may then load and configure a virtual machine from the virtual machine pool 880 in an order related to the priority level, and dispatch the virtual machine to the analysis engine 882 to process the suspicious network content.

The heuristic module 860 may provide the packet containing the suspicious network content to the scheduler 870, along with a list of the features present in the packet and the malicious probability scores associated with each of those features. Alternatively, the heuristic module 860 may provide a pointer to the packet containing the suspicious network content to the scheduler 870 such that the scheduler 870 may access the packet via a memory shared with the heuristic module 860. In another embodiment, the heuristic module 860 may provide identification information regarding the packet to the scheduler 870 such that the scheduler 870, or virtual machine may query the heuristic module 860 for data regarding the packet as needed.

The scheduler 870 may identify the client device 830 and retrieve a virtual machine associated with the client device 830. A virtual machine may itself be executable software that is configured to mimic the performance of a device (e.g., the client device 830). The virtual machine may be retrieved from the virtual machine pool 880. Furthermore, the scheduler 870 may identify, for example, a Web browser running on the client device 830, and retrieve a virtual machine associated with the web browser.

In some embodiments, the heuristic module 860 transmits the metadata identifying the client device 830 to the scheduler 870. In other embodiments, the scheduler 870 receives one or more data packets of the network data from the heuristic module 860 and analyzes the one or more data packets to identify the client device 830. In yet other embodiments, the metadata may be received from the network tap 840.

The scheduler 870 may retrieve and configure the virtual machine to mimic the pertinent performance characteristics of the client device 830. In one example, the scheduler 870 configures the characteristics of the virtual machine to mimic only those features of the client device 830 that are affected by the network data copied by the network tap 840. The scheduler 870 may determine the features of the client device 830 that are affected by the network data by receiving and analyzing the network data from the network tap 840. Such features of the client device 830 may include ports that are to receive the network data, select device drivers that are to respond to the network data, and any other devices coupled to or contained within the client device 830 that can respond to the network data. In other embodiments, the heuristic module 860 may determine the features of the client device 830 that are affected by the network data by receiving and analyzing the network data from the network tap 840. The heuristic module 860 may then transmit the features of the client device to the scheduler 870.

The virtual machine pool 880 may be configured to store one or more virtual machines. The virtual machine pool 880 may include software and/or a storage medium capable of storing software. In one example, the virtual machine pool 880 stores a single virtual machine that can be configured by the scheduler 870 to mimic the performance of any client device 830 on the communication network 820. The virtual machine pool 880 may store any number of distinct virtual machines that can be configured to simulate the performance of a wide variety of client devices 830.

The analysis engine 882 simulates the receipt and/or display of the network content from the server device 810 after the network content is received by the client device 110 to analyze the effects of the network content upon the client device 830. The analysis engine 882 may identify the effects of malware or malicious network content by analyzing the simulation of the effects of the network content upon the client device 830 that is carried out on the virtual machine. There may be multiple analysis engines 882 to simulate multiple streams of network content. The analysis engine 882 may be configured to monitor the virtual machine for indications that the suspicious network content is in fact malicious network content. Such indications may include unusual network transmissions, unusual changes in performance, and the like. This detection process is referred to as a dynamic malicious content detection.

The analysis engine 882 may flag the suspicious network content as malicious network content according to the observed behavior of the virtual machine. The reporting module 884 may issue alerts indicating the presence of malware, and using pointers and other reference information, identify the packets of the network content containing the malware. Additionally, the server device 810 may be added to a list of malicious network content providers, and future network transmissions originating from the server device 810 may be blocked from reaching their intended destinations, e.g., by firewall 825.

The computer network system may also include a further communication network 890, which couples the malicious content detection system (MCDS) 850 with one or more other MCDS, of which MCDS 892 and MCDS 894 are shown, and a management system 896, which may be implemented as a Web server having a Web interface. The communication network 890 may, in some embodiments, be coupled for communication with or part of network 820. The management system 896 is responsible for managing the MCDS 850, 892, 894 and providing updates to their operation systems and software programs. Also, the management system 896 may cause malware signatures generated by any of the MCDS 850, 892, 894 to be shared with one or more of the other MCDS 850, 892, 894, for example, on a subscription basis. Moreover, the malicious content detection system as described in the foregoing embodiments may be incorporated into one or more of the MCDS 850, 892, 894, or into all of them, depending on the deployment. Also, the management system 896 itself or another dedicated computer station may incorporate the malicious content detection system in deployments where such detection is to be conducted at a centralized resource.

Further information regarding an embodiment of a malicious content detection system can be had with reference to U.S. Pat. No. 8,171,553, the disclosure of which being incorporated herein by reference in its entirety.

As described above, the detection or analysis performed by the heuristic module 860 may be referred to as static detection or static analysis, which may generate a first score (e.g., a static detection score) according to a first scoring scheme or algorithm. The detection or analysis performed by the analysis engine 882 is referred to as dynamic detection or dynamic analysis, which may generate a second score (e.g., a dynamic detection score) according to a second scoring scheme or algorithm. The first and second scores may be combined, according to a predetermined algorithm, to derive a final score indicating the probability that a malicious content suspect is indeed malicious.

Furthermore, detection systems 850 and 892-894 may deployed in a variety of distribution ways. For example, detection system 850 may be deployed as a detection appliance at a client site to detect any suspicious content, for example, at a local area network (LAN) of the client. In addition, any of MCDS 892 and MCDS 894 may also be deployed as dedicated data analysis systems. Systems 850 and 892-894 may be configured and managed by a management system 896 over network 890, which may be a LAN, a wide area network (WAN) such as the Internet, or a combination of both. Management system 896 may be implemented as a Web server having a Web interface to allow an administrator of a client (e.g., corporation entity) to log in to manage detection systems 850 and 892-894. For example, an administrator may able to activate or deactivate certain functionalities of malicious content detection systems 850 and 892-894 or alternatively, to distribute software updates such as malicious content definition files (e.g., malicious signatures or patterns) or rules, etc. Furthermore, a user can submit via a Web interface suspicious content to be analyzed, for example, by dedicated data analysis systems 892-894. As described above, malicious content detection includes static detection and dynamic detection. Such static and dynamic detections can be distributed amongst different systems over a network. For example, static detection may be performed by detection system 850 at a client site, while dynamic detection of the same content can be offloaded to the cloud, for example, by any of detection systems 892-894. Other configurations may exist.

Figure 6:
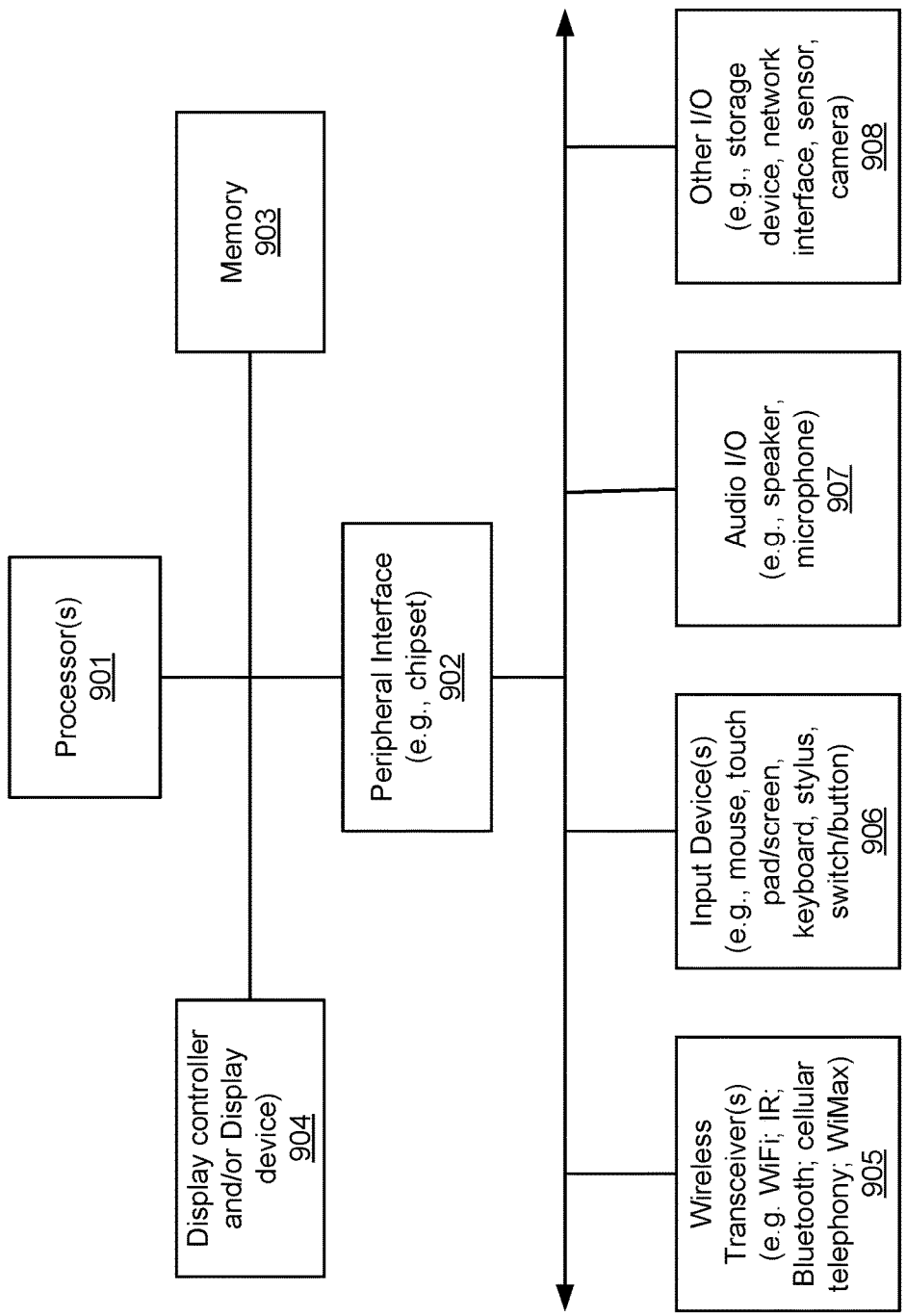
FIG. 6 is a block diagram illustrating an example of a data processing system which may be used with one embodiment of the invention.

FIG. 6 is a block diagram illustrating an example of a system which may be used with one embodiment of the invention. For example, the system as shown in FIG. 6 may represents any of data processing systems described above performing any of the processes or methods described above. The data processing system as shown in FIG. 6 may represent a desktop, a tablet, a server, a mobile phone, a media player, a personal digital assistant (PDA), a personal communicator, a gaming device, a network router or hub, a wireless access point (AP) or repeater, a set-top box, or a combination thereof.

Referring to FIG. 6, in one embodiment, the system includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 6 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for detecting exfiltration of data, comprising:
    executing a malicious content suspect within a virtual machine that is configured to simulate a target operating environment, wherein the malicious content suspect comprises content that is potentially malicious;
    performing a packet inspection on attempted outbound network traffic by a packet inspector running within the virtual machine, the packet inspection to determine whether a portion of the attempted outbound network traffic matches one or more portions of predetermined network traffic patterns or signatures;
    determining whether the attempted outbound network traffic includes at least one environmental property, which is unique or distinctive of the target operating environment including at least the virtual machine, by at least determining the portion of the attempted outbound network traffic matches the one or more portions of predetermined network traffic patterns or signatures, the match indicates that the malicious content suspect is attempting to perform an exfiltration of data; and
    transmitting an alert indicating that the malicious content suspect is attempting to perform an exfiltration of data from the virtual machine based on determining that the attempted outbound network traffic includes the at least one environmental property of the target operating environment and precluding migration of the attempted outbound network traffic outside of the virtual machine when the attempted outbound network traffic includes the at least one environmental property that is unique or distinctive to the target operating environment.

2. The method of claim 1, wherein the determining whether the attempted outbound network traffic includes the at least one environmental property of the target operating environment comprises matching the at least one environmental property to any of a set of patterns or signatures predefined according to a plurality of rules that represent a set of predefined system characteristics.

3. The method of claim 1, wherein the at least one environmental property comprises at least one of (i) a computer name or NetBIOS name, (ii) a serial number of a hardware component, or (iii) an identifier of a software application.

4. The method of claim 1, wherein the at least one environmental property comprises information that uniquely or distinctively identifies hardware of a machine represented by the virtual machine.

5. The method of claim 1, wherein the alert being transmitted over a network.

6. The method of claim 1 further comprising:
    causing a firewall to block any further network traffic associated with the malicious content suspect.

7. The method of claim 6, wherein the blocked network traffic includes at least an inbound traffic associated with the malicious content suspect.

8. The method of claim 6, wherein the blocked network traffic includes outbound network traffic transmitted to reach an actual destination outside of the virtual machine.

9. A non-transitory machine-readable medium having instructions stored therein, which when executed by a processor of a system, cause the processor to perform operations for detecting exfiltration, comprising:
    executing a malicious content suspect within a virtual machine that is configured to simulate a target operating environment, wherein the malicious content suspect comprises content that is potentially malicious;

performing a packet inspection within the virtual machine on attempted outbound network traffic by analyzing a portion of the attempted outbound network traffic in comparison to one or more portions of predetermined network traffic patterns or signatures;

determining whether the attempted outbound network traffic includes at least one environmental property of the target operating environment represented by the virtual machine that is unique or distinctive of the target operating environment by at least determining that the portion of the attempted outbound network traffic matches the one or more portions of predetermined network traffic patterns or signatures, the at least one environmental property is unique or distinctive of the target operating environment and the match indicates that the malicious content suspect is attempting to perform an exfiltration of data; and transmitting an alert indicating that the malicious content suspect is attempting to perform an exfiltration of data from the virtual machine based on determining that the attempted outbound network traffic includes the at least one environmental property of the target operating environment and precluding migration of the attempted outbound network traffic outside of the virtual machine when the attempted outbound network traffic includes the at least one environmental property that is unique or distinctive to the target operating environment.

10. The non-transitory machine-readable medium of claim 9, wherein the determining whether the outbound network traffic includes the at least one environmental property of the target operating environment comprises matching the at least one environmental property to any of a set of patterns associated with a virtual machine selected to process the malicious content suspect operating within the virtual machine.

11. The non-transitory machine-readable medium of claim 9, wherein the at least one environmental property of the target operating environment comprises an identifier of an electronic device corresponding to the virtual machine.

12. The non-transitory machine-readable medium of claim 9, wherein the performing of the packet inspection comprises performing a search of data that is part of the attempted outbound network traffic based on a predetermined signature that was generated by encoding, using a predetermined encoding algorithm, a text string representing a unique identifier of an electronic device corresponding to the virtual machine.

13. The non-transitory machine-readable medium of claim 9, wherein the at least one environmental property of the target operating environment is unique when an encoded or compressed form of data of the at least one environmental property fails to match generic network traffic.

14. The non-transitory machine-readable medium of claim 9, wherein the migration of the attempted outbound network traffic is precluded by blocking network traffic associated with the malicious content suspect.

15. The non-transitory machine-readable medium of claim 14, wherein the blocked network traffic includes at least an inbound traffic associated with the malicious content suspect.

16. The non-transitory machine-readable medium of claim 14, wherein the blocked network traffic includes outbound network traffic transmitted to reach an actual destination outside of the virtual machine.

17. The non-transitory machine-readable medium of claim 9, wherein the migration of the attempted outbound network traffic is precluded by causing a firewall to block any further network traffic associated with the malicious content suspect.

18. A system, comprising:
a processor; and
a memory coupled to the processor for storing instructions, which when executed from the memory, cause the processor to
execute a malicious content suspect within a virtual machine that is configured to simulate a target operating environment, wherein the malicious content suspect comprises content that is potentially malicious,
perform a packet inspection, by a packet inspector executed by the processor and running within the virtual machine, on attempted outbound network traffic, the packet inspection to determine whether a portion of the attempted outbound network traffic matches one or more portions of predetermined network traffic patterns or signatures,
determine whether the attempted outbound network traffic includes at least one environmental property of the target operating environment that is unique or distinctive of the target operating environment based on determining that the portion of the attempted outbound network traffic matches the one or more portions of predetermined network traffic patterns or signatures, and
transmit an alert indicating that the malicious content suspect is attempting to perform an exfiltration of data from the virtual machine upon determining that the attempted outbound network traffic includes the at least one environmental property of the target operating environment and precluding migration of the attempted outbound network traffic outside of the virtual machine when the attempted outbound network traffic includes the at least one environmental property that is unique or distinctive to the target operating environment.

19. The system of claim 18, wherein the determining whether the attempted outbound network traffic includes the at least one environmental property of the target operating environment comprises matching the at least one environmental property to any of a set of patterns associated with the virtual machine selected to process the malicious content suspect.

20. The system of claim 18, wherein the alert being transmitted to a controller, the controller is implemented as part of a virtual machine monitor (VMM).

21. The system of claim 18, wherein the at least one environmental property of the target operating environment comprises an identifier of an electronic device corresponding to the virtual machine.

22. The system of claim 18, wherein the performing of the packet inspection comprises performing a search of data that is part of the attempted outbound network traffic based on a predetermined signature that was generated by encoding, using a predetermined encoding algorithm, a text string representing a unique identifier of an electronic device corresponding to the virtual machine comprising the at least one environmental property.

23. The system of claim 18, wherein the at least one environmental property of the virtual machine is unique or distinctive when an encoded or compressed form of data of the at least one environmental property fails to match generic network traffic.

24. The system of claim 18, wherein the at least one environmental property is unique or distinctive to the target operating environment represented by the virtual machine in that the at least one environmental property pertains to the virtual machine so as to allow the match to indicate that the malicious content suspect is attempting to perform an exfiltration of data.

25. The system of claim 24, wherein the at least one environmental property includes at least one of (i) a computer name or NetBIOS name, (ii) a serial number of a hardware component, or (iii) an identifier of a software application.

26. The system of claim 18 wherein the packet inspector to perform packet inspection based on a set of rules or policies.

27. The system of claim 18, wherein the migration of the attempted outbound network traffic is precluded by at least blocking network traffic associated with the malicious content suspect.

28. The system of claim 18, wherein the migration of the attempted outbound network traffic is precluded by causing a firewall to block any further network traffic associated with the malicious content suspect.

* * * * *